(12) United States Patent
Tivadar

(10) Patent No.: US 6,668,485 B1
(45) Date of Patent: Dec. 30, 2003

(54) AGROTECHNICAL METHOD FOR TRAINING BRANCH CORDON VINE AND FOR REGULATION OF ITS GROWTH AND YIELD

(76) Inventor: Babó Tivadar, 1094 Budapest, Ferenc tér 12. IV/4 (HU)

( * ) Notice: Subject to any disclaimer, the term of this patent is extended or adjusted under 35 U.S.C. 154(b) by 0 days.

(21) Appl. No.: 09/868,436
(22) PCT Filed: Dec. 14, 1999
(86) PCT No.: PCT/HU99/00098
§ 371 (c)(1),
(2), (4) Date: Oct. 2, 2001
(87) PCT Pub. No.: WO00/35269
PCT Pub. Date: Jun. 22, 2000

(30) Foreign Application Priority Data

Dec. 16, 1998 (HU) .............................. 9802935

(51) Int. Cl.⁷ ............................ A01G 17/02; A01G 1/00
(52) U.S. Cl. ................ 47/58.1; 47/70; 47/46; 47/44; 56/330
(58) Field of Search ............... 47/44, 46, 47, 47/70, 1.43, 58.1

(56) References Cited

U.S. PATENT DOCUMENTS

| | | | |
|---|---|---|---|
| 3,536,993 A | * | 10/1970 | Siebol |
| 3,585,756 A | * | 6/1971 | Johnson ..................... 47/58 |
| 4,333,266 A | * | 6/1982 | Tivadar ....................... 47/58 |
| 4,480,402 A | * | 11/1984 | Hiyama et al. ............... 47/1 R |
| 4,543,775 A | * | 10/1985 | Horn et al. ................... 56/235 |
| 5,711,109 A | * | 1/1998 | Pitts ............................. 47/58 |
| 6,374,538 B1 | * | 4/2002 | Morris et al. .............. 47/58.1 |

FOREIGN PATENT DOCUMENTS

| | | | | |
|---|---|---|---|---|
| CN | 1321416 A | * | 4/2000 | .......... A01G/17/02 |
| DE | 21 13 293 | | 10/1971 | |
| DE | 3818640 A1 | * | 12/1989 | .......... A01G/17/00 |
| FR | 748 916 | | 7/1933 | |
| SU | 2507591 | * | 6/1977 | .......... A01G/17/02 |
| SU | 1338807 A | * | 11/1982 | .......... A01G/17/00 |
| SU | 1355174 A | * | 5/1985 | .......... A01G/17/00 |
| SU | 1523117 A | * | 8/1987 | .......... A01G/17/00 |

* cited by examiner

Primary Examiner—Peter M. Poon
Assistant Examiner—Andrea M. Valenti
(74) Attorney, Agent, or Firm—Kenyon & Kenyon

(57) ABSTRACT

Agrotechnical method for Branch Cordon trained vine, for the mechanizable control of its growth, and yield; where in the branch cordon plantation a cordon arm supporting wire parallel with the direction of the stock row, preferably in 160–190 cm height is used; long canes are preferably cultivated every 10–30–40 cm from one another into producing twigs; characterised in that sprouting, yield and quality are regulated by the thinning of the main buds in the upper zone of the foliage wall, and the measure of thinning of the main buds thus producing twigs are cultivated having short shoots and short canes (which require no pruning), which appropriately reach near the ground, have off-shoots and sometimes grow higher than the cordon arm.

12 Claims, 2 Drawing Sheets

Figure 1A:
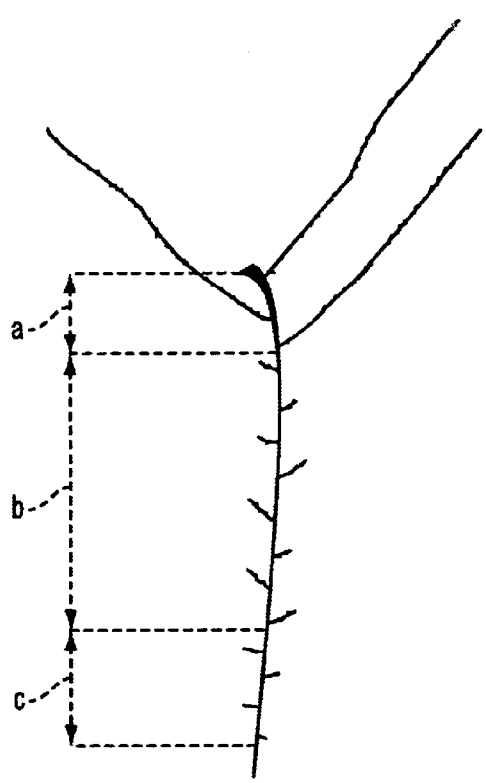

AGROTECHNICAL METHOD FOR TRAINING BRANCH CORDON VINE AND FOR REGULATION OF ITS GROWTH AND YIELD

FIELD OF THE INVENTION

The present invention relates to an agrotechnical method for the training of branch cordon vine and for the mechanizable regulation of its growth and yield.

BACKGROUND OF THE INVENTION

It is known that all work procedures required by vine production have been successfully mechanized, but for winter pruning—which regulates the yield, the quality of the crop and the condition of the stem—no adequate machinery, replacing manual pruning has been constructed until now. The lack of mechanizing in the area of pruning results in a temporary peak in labour demand.

Crop regulation by pruning is problematic because, as it is well known, winter pruning forces the vines to exert intense vegetative activity in developing "long" shoots, canes. As a result of the unnecessary "cane yield", the amount of crop is by far lower than the biologically possible yield. (The cane yield of the vine grows at the expense of cluster yield.)

These problems led researchers to conduct more detailed investigations into possibilities of viticulture without regular pruning. The experiments proved that the omission of winter pruning is very detrimental—especially in the first years of transition—for the stems that were formerly regularly pruned and have long shoots, canes. This, due to the greater yield, often leads to the exhaustion of stems. Years after the cancellation of pruning the plants reach a state where they are capable of self-regulation. In the average of many years, their yield is greater than the yield of the pruned stems. The number of shoots increases, their length is much shorter than with the pruned vines. The ripening of the shoots customarily depends on the yield and the amount of shadow cast on them. The densely sprouted stem sections sooner or later thin themselves, because the shoots become mature in a shorter length. On the stem sections however, that are less dense, the ripening of the shoots that receive more sunlight improves. Thus shoot density becomes balanced on the stem; the shoots "migrate" to the sun.

Yield and average vine (cane) length of vines vary inversely. In the intermittent year, the number of shoots is smaller than the average of many years, and they get comparatively longer ripened by fall. The must degree of the crop is generally high. A growth in the yield may be expected in the following year. In years with high amount of yield the number of shoots increases, their production improves, but shoot growing capacity and ripening of canes worsens. The loose clusters are less sweet. A year with high amount of yield is thus followed by an intermittent year.

Often about 70–95% of the short shoots of vine cultivated regularly without pruning do not become ripened, do not turn into wood. The parts of the shoots that did not grow fully ripe break off after defoliating; the vine thus "prunes" itself.

With the knowledge of the mentioned self-regulation of the unpruned vine, a new method of vine-stock training was developed.

This is the so-called Branch Cordon vine-stock training ("ágaskordon", "Senkrechtes Spalier"), which is described in detail in the specification U.S. Pat. No. 4,333,266, granted for the Applicant of the present application.

The above mentioned, comparatively new stock training method requires a wired support system.

The support system may be single, or double layered. The single layer support system is in most cases identical with the Single Curtain, the double layer support system with the G.D.C. (Geneva Double Curtain) stock training's T-shaped support system. The horizontal wire (or wires) of the support system carries the cordon arm, and the (full) weight of the vine stock. The poles of the support system sustain the horizontal wire (wires).

It is preferable to decide on a 160–190 cm height for the trunk. The horizontal expansion of the stock is controlled by the length of the cordon arm, and by the number of the shoots and producing canes on the cordon arm. Therefore on the cordon arm, that was trained as the continuation of the stem, long shoots (canes) are trained in the first years.

When this is accomplished, the vine is turned to "bearing". In the spring of the year of turning to bearing, the canes of the cordon arm are thinned out about every 10–30–40 cm, and the canes are cut back near the ground. Subsequent to pruning, the number of shoots on the vine and the cluster load is large. The shoot, and cane production will be similar to that of the regularly unpruned vine stock. Through the years, the produced long canes age to producing twigs. The Branch Cordon stock training method (according to the mentioned previous patent) solved the crop regulation by the shortening of the canes and produced long canes, also by cutting them back from the ground at different lengths, and by thinning the clusters of flower off (applying a chemical agent). In practice however, the mentioned methods did not fulfil the expectations. After their application the difference between the bud, shoot and cluster load of the stocks was significantly different. The producing twigs shortened, and by the cordon arm shoots developed that ripened on a long section, such as are typical of vine cultivated by pruning. The parts that were cut off near the ground were not "replaced". The production surface of the vines that were production controlled in this manner "withdrew" near the cordon arm, and the stem became bushy there. The training method had to be abandoned, and the traditional manual pruning reintroduced.

It was also confirmed that the branch cordon trained stems require growth control along with the reduction of the number of clusters.

With regard to the above detailed problems, the aim of the present invention is to develop a procedure that makes possible to maintain the stem shape formed by pruning, the regulation of shoot growing capacity and yield on the branch cordon cultivated vines.

It is known that on the canes of the vine side buds by the main buds of the winter light buds can be found. At bud pushing the main buds start swelling, but the side buds commonly remain dormant. The growth capacity, ripening and fertility of shoots pushing out of side buds is in general far behind the ones developing from main buds. It is also known that bud differentiation—fertility—is worse with the branch cordon vines, than with the vines that were production controlled by pruning. The growth and yield control method, which is the object of the present invention, is based on the knowledge of these facts. According to the invention, the task is solved by thinning out of the swelling buds, short shoots (later main buds) using a specific process.

SUMMARY OF THE INVENTION

The solution of the invention is primarily based on the recognition that sustaining of the form of the stem that was created by pruning and the yield amount and quality control may be achieved by main bud thinning—mainly in the area specified by the invention.

Therefore the object of the invention is an agrotechnical method for Branch Cordon trained vine, for the mechanizable control of its growth, and yield; where in the branch cordon plantation a cordon arm is used supporting wire parallel with the direction of the stock row, preferably in 160–190 cm height; preferably long canes are cultivated every 10–30–40 cm from one another into producing twigs; characterised by that sprouting, yield and quality are regulated by the amount (rate) of thinning of the main buds in the upper zone of the foliage wall, thus producing twigs are cultivated having short shoots and short canes (which require no pruning), that expediently reach near the ground, have off-shoots and sometimes grow higher than the cordon arm.

The growth and yield control method according to the invention fits well the shooting characteristics of the branch cordon vine.

The pushing out of the branch cordon buds is a process extended in time. The buds with more advantageous polarity may push out weeks before the other ones. Consequently the shoots in the stem's upper region—near the cordon arm—will mature fully and long, while the shoots under them, in the overshadowed area, will grow ripe on a short section and not well. At bud pushing—after the thinning out of the early swelling buds near the cordon arm—the habit of the stock changes.

Due to the location with favourable polarity the side buds by the thinned out main buds push out in two to three weeks. Thus, the growth of these shoots is delayed. With this, their counterparts that are near the ground lose their vegetative disadvantage, their shoots grow considerably longer, are more ripe. As a result of these the growing capacity and ripening on the different sections—in agreement with our goals—becomes equalised. (The long shoot—cane growth ceases, or is lessened.) The foliage wall reaches near the ground.

With the thinning out of the swollen main buds the number of growth poles (shoots) does not decrease, but the growing capacity is lessened at the location of the treatment. Depending on the measure of main bud thinning, the cluster yield of the stock decreases, the amount—proportion of the barren shoots increases, the producing shoots' decreases. As a result of the treatment, the quality of crop improves.

The shoots reaching near the ground overshadow the stock row. The overshadowed rows of stock are less inclined to becoming weedy. The shoot growth stops soon. As a result of the short shoots, the number of plant-protection sprayings may be reduced. The branch cordon plantation cultivated in this way may produce an annually balanced yield.

Winter pruning is not necessary for maintaining this cultivation method with vines that already settled in this way. Manual pruning, plant cultivation is limited to the forming and re-forming of the stem shape. Thus the amount of crop, must degree and the ripening of the shoots on the plantation's stems are regulated by the measure of the main bud thinning, by the adjustment of the proportion of the barren-producing shoots. The swelling main buds are thinned manually (by a hand tool) or by power machine (like tractor) powered shaking and/or sliding-turning (rubbing-brushing) and/or high-pressure water or spraying adapter. In this latter case chemicals destroy a portion of the swelling buds. The proportion of the main buds thinned off and remaining on the stem is adjusted in the meanwhile.

The crop controlling adapter is expediently powered by a tractor. The driver, by manipulating the machine can alter the amount—ratio of the main buds rubbed off. The result of the treatment depends on: phenology phase, variety, type, number and output of the adapter, its speed and the treated section's width, the times the bud thinning was repeated, and so on.

DETAILED DESCRIPTION OF THE INVENTION

Figure 1B:
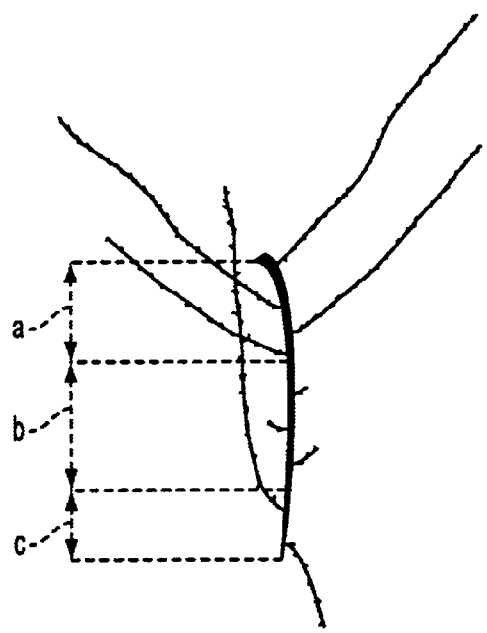
Figure 1C:
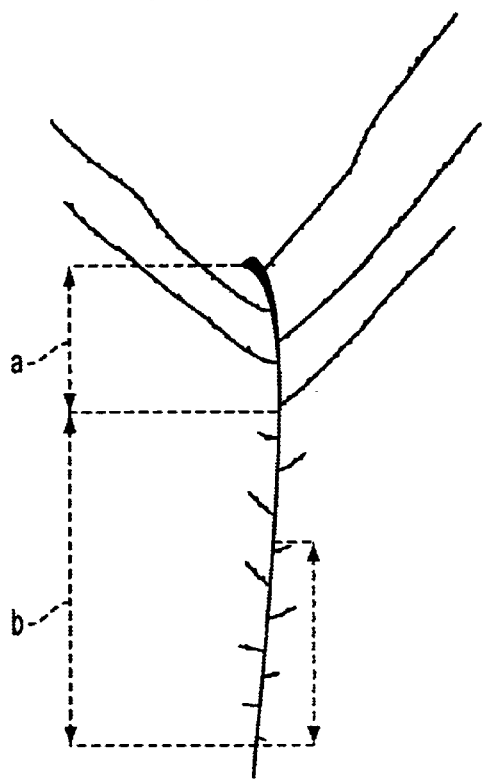
Figure 1D:
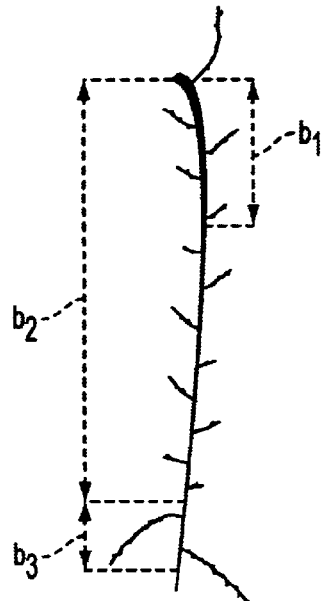
Figure 2:
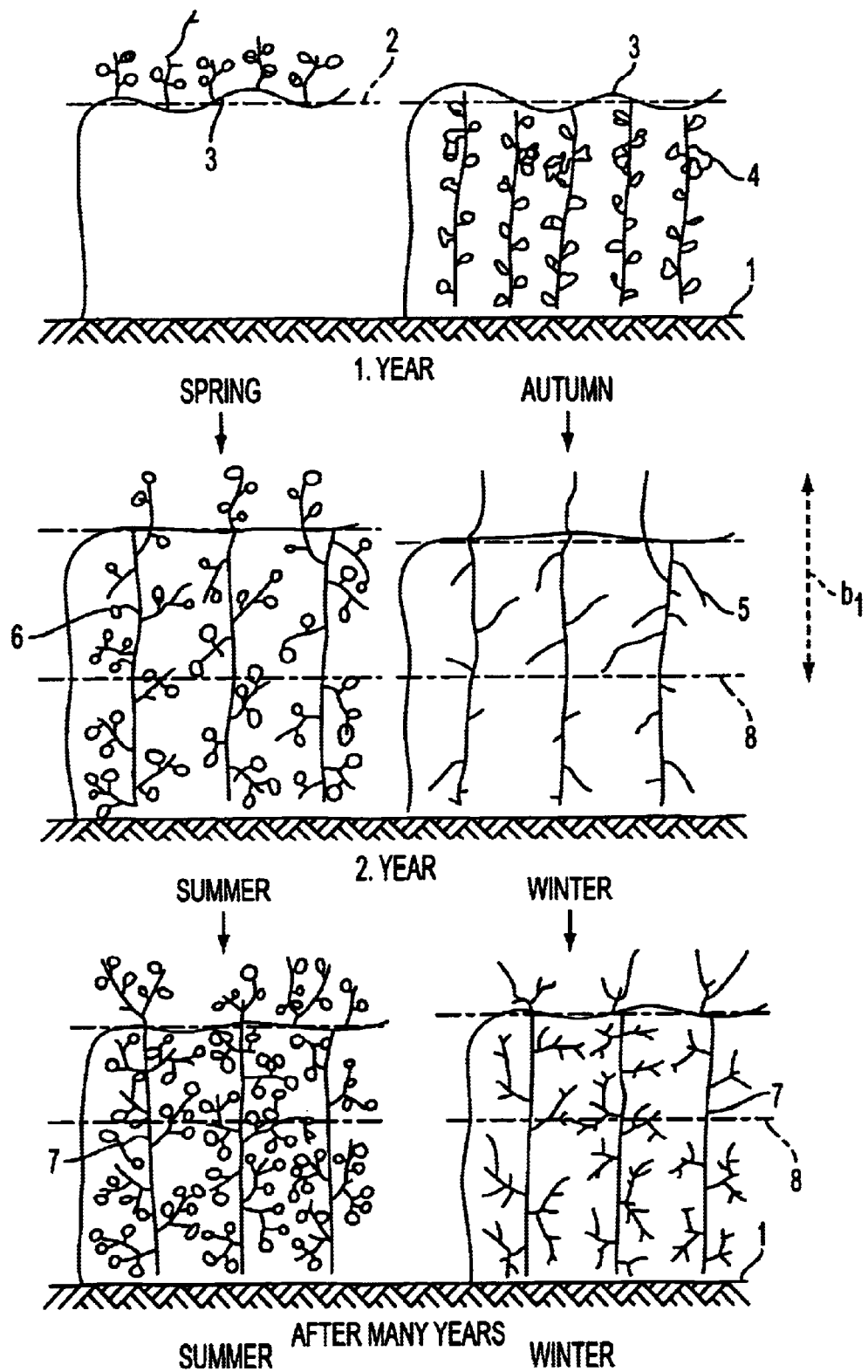

The known solutions, and the procedure of the invention is illustrated—for easier understanding—by the figures, where:

FIG. 1A shows the basic condition of the branch cordon stem training, the shoot ripening following a full long cane load, while FIGS. 1B–1C display the effects of the known solutions and 1D represents the effect of the load solution of the invention on the shoot length and the shoot ripening on the long cane, FIG. 2 demonstrates the method of the invention for several years, for different seasons.

The arrangement of the hanging long canes on the construction examples shown on FIGS. 1A–1D depends on the manner of loading, while their number depends on the measure of loading.

FIG. 1A shows the basic condition of the long cane loading, where in section a there are long canes typical of pruned vine, in section b there are short canes typical of unpruned vine, and in section c there are unripe shoots. It is foreseeable that the long canes in section a will result in the stem becoming bushy in a few years.

FIGS. 1B and 1C shows the solution offered by U.S. Pat. No. 4,333,266. The cut back, shortened long cane displayed on FIG. 1B has long canes in section a, short canes in section b, and in section c there are long canes again. In this case, the producing twigs shorten yearly, and in the line of the cordon arm long shoots are produced, which as we saw it before, lead to bushiness of the stems.

FIG. 1C shows the possibility when we carry out flower thinning on the long cane. In this case, the long canes are found in the a section, the short canes in the b section, where the flower thinning took place. The figure shows that the desired effect cannot be achieved this way, since the shoots in the upper section become just as untreatable as with the basic condition shown in FIG. 1A. It must be emphasised though that on the thinned portion, the shoots become mature, and the long cane is not shortened.

FIG. 1C shows the procedure of the invention. Here, short canes may be found in sections $b_1$ and $b_2$. In the section close to the ground—$b_3$—a longer portion of the shoots becomes ripe. Bud thinning is done in section $b_1$. It can be observed, that in this case, the length of the shoots will be equally short on the long cane. The appearance of the long canes that are near the ground is not disturbing, because these provide a chance for the plant to extend toward the ground if necessary. It is to be mentioned, that the area of the main bud thinning is the zone where most main buds are wilfully removed, but—depending on the desired method/measure of the regulation—it is inevitable that main buds will fall off even in the sections where the treatment is not being carried out. The emphasis though is always on that the majority of main buds would be broken off in a certain zone, in this case in the upper part of the foliage wall, close to the cordon arm.

FIG. 2. shows the 1 ground level, 2 wire, between them the 4 shoot, 5 cane, 6 long cane, 7 producing twig, and the 3 cordon arm and 8 thinning limit.

The training, growth and yield control of the branch cordon stem is shown on FIG. 2. The 3 cordon arm and on it the training of the 4 long shoots are displayed in the first year's spring and fall. In the second year we show the place and the effect of bud thinning—in section $b_1$—on the 6 long cane, in the summer and after defoliating, in the winter.

After many years the 6 long canes become 7 producing twigs. FIG. 2 follows through the different periods of stem development.

It have to be understood, that the method of the invention does not exclude that manual (mechanical) pruning, flower thinning, shortening (cutting back) of producing twigs, or chemical growth and/or yield control would be accomplished in the plantation, and further that the stock condition would be controlled by nutrition-water supply regulation.

The procedure according to the invention does not exclude the installation of additional wire(s) for the supporting of producing twigs beside the wire(s) holding the cordon arm.

What is claimed:

1. Agrotechnical method for Branch Cordon trained vine, for the mechanizable control of its growth, and yield; wherein at the branch cordon plantation a cordon arm supporting wire parallel with the direction of the stock row, approximately 160–190 cm in height is used; long canes are cultivated approximately every 10–30–40 cm from one another into producing twigs; characterised in that sprouting, yield and quality are regulated by the thinning of the main buds in the upper zone of the foliage wall, and the measure of thinning of the main buds thus producing twigs are cultivated having short shoots and short canes which require no pruning, which appropriately reach near the ground, have off-shoots and sometimes grow higher than the cordon arm.

2. The procedure according to claim 1, characterised by that the swelling main buds are thinned out manually by at least one of a hand tool, by power machine powered tool for at least one of shaking, sliding-turning, and rubbing-brushing, high-pressure water, and spraying adapter.

3. The procedure according to claim 1, characterised in that the ratio of the main buds thinned off and those remaining on the stem is adjusted in the course of the procedure.

4. The procedure according to claim 1, characterised in that while the main bud thinning yield control method is carried out, at least one of manual summer-winter pruning, topping, flower thinning, shortening of producing twigs, chemical growth control and yield control is also accomplished in the plantation.

5. The procedure according to claim 1, characterised in that shoot and branching twig supporting wires are used in the plantation.

6. An agrotechnical method for a Branch Cordon trained vine, for the mechanizable control of its growth and yield comprising:

providing a cordon arm supporting wire for the branch cordon plantation parallel with the direction of the stock row;

cultivating long canes a distance from one another into producing twigs;

regulating sprouting, yield and quality by thinning main buds in the upper zone of the foliage wall; and cultivating the producing twigs where the thinning of the main buds has occurred to produce twigs that have short shoots and short canes that require no pruning, which appropriately reach near the ground, have off-shoots and sometimes grow higher than the cordon arm.

7. The method of claim 6 wherein said cordon arm supporting wire is at a height of 160–190 cm.

8. The method of claim 7 wherein the distance in said step of cultivating long canes is between 10 and 40 cm.

9. The method of claim 6, wherein in said regulating step, the swelling main buds are thinned out manually by at least one of a hand tool, by power machine powered tool for at least one of shaking, sliding-turning, and rubbing-brushing, high-pressure water, and spraying adapter.

10. The method of claim 6, wherein in the ratio of the main buds thinned off and those remaining on the stem is adjusted during the course of the procedure.

11. The method of claim 6 wherein while the main bud thinning yield control is carried out, at least one of manual summer-winter pruning, topping, flower thinning, shortening of producing twigs, chemical growth control and yield control is also performed in the plantation.

12. The method of claim 6 wherein shoot and branching twig supporting wires are used in the plantation.

* * * * *